J. H. McCRARY AND C. A. RUSS.
ATTACHMENT FOR REFRIGERATING MACHINES.
APPLICATION FILED APR. 10, 1920.
1,414,032.
Patented Apr. 25, 1922.
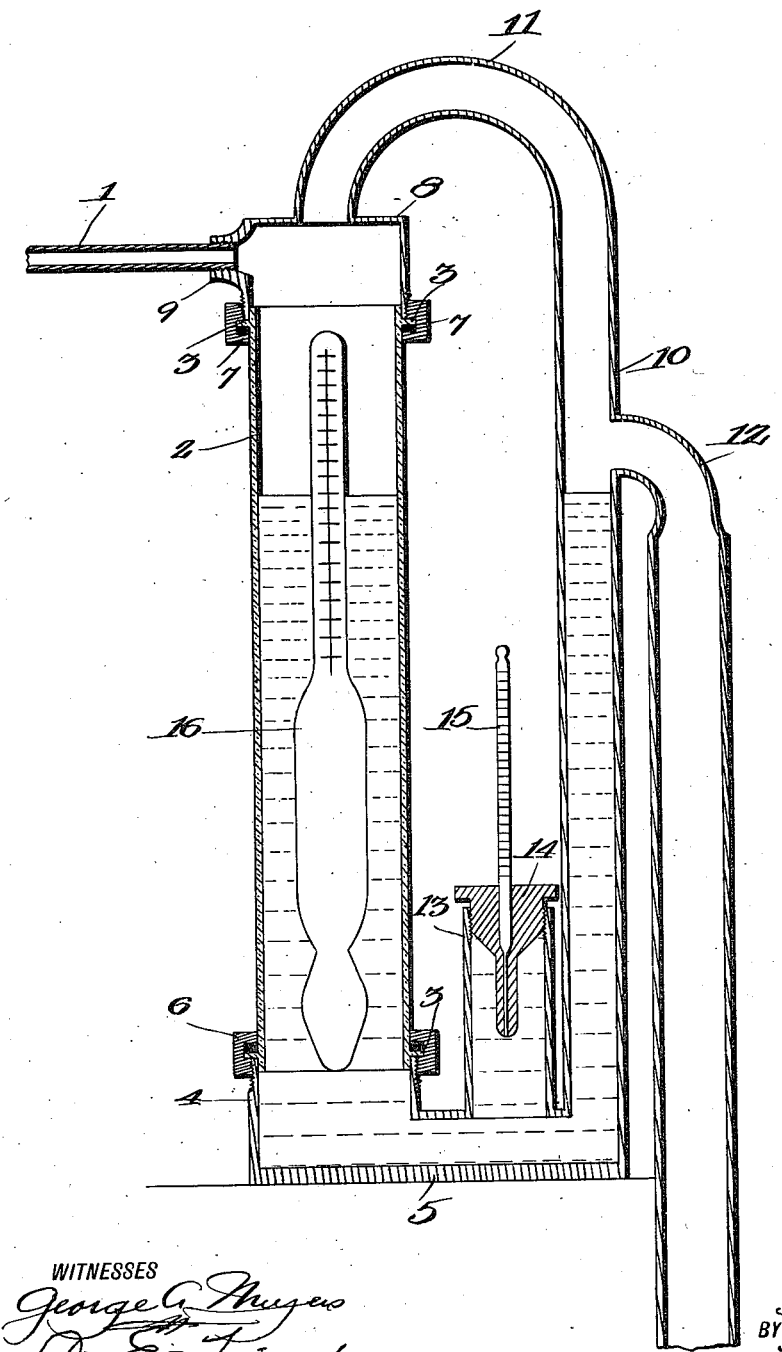
WITNESSES
INVENTOR
C. A. Russ,
J. H. McCrary,
BY
ATTORNEYS

UNITED STATES PATENT OFFICE.

JOSEPH HENRY McCRARY AND CHESTER ARTHUR RUSS, OF TULSA, OKLAHOMA.

ATTACHMENT FOR REFRIGERATING MACHINES.

1,414,032.  Specification of Letters Patent.  Patented Apr. 25, 1922.

Application filed April 10, 1920. Serial No. 372,985.

*To all whom it may concern:*

Be it known that we, Joseph Henry McCrary and Chester Arthur Russ, citizens of the United States, and residents of Tulsa, in the county of Tulsa and State of Oklahoma, have invented certain new and useful Improvements in Attachments for Refrigerating Machines, of which the following is a specification.

Our invention is an improvement in attachments for refrigerating machines, and has for its object to provide a device of the character specified by means of which the percentage of ammonia in the liquor used in an absorption refrigerating machine may be ascertained at any time, and suitable for use for ascertaining the percentage of liquid in any solution where a difference in specific gravity exists.

In the drawing, there is shown a sectional view of the device.

In the present embodiment of the invention, the liquid is fed through a pipe 1 into a glass container 2 of tubular form. This container has external annular ribs 3 at its ends, and the lower end of the container is connected with a nipple 4 on a suitable base 5, by means of a packing nut 6 which is threaded onto the nipple and which engages the rib 3, a packing being arranged between the rib and the nut. A similar nut 7 connects a cap 8 to the upper end of the glass container, and the pipe 1 is threaded into a lateral nipple 9 on the cap.

This cap is connected to a metallic tubular structure 10 which extends upward from the base at the opposite end from the nipple 4, by means of an elbow 11, and the tubular structure 10 has an overflow pipe 12 near its upper end just above the level which is desired to be maintained in the apparatus.

The base 5 is hollow, there being free communication between the nipple 4 and the tubular structure 10, and a nipple 13 extends upwardly from the base between the tubular structure 10 and the nipple 4, the said nipple 13 also communicating freely with the tubular structure 10 and the nipple 4.

A plug 14 is threaded into the nipple 13, and a thermometer 15 is supported by the plug, so that its lower end will be subjected to the influence of the liquid in the apparatus. A hydrometer 16 is supported in the glass container 2 and in practice, suitable valves will be arranged in the tubes 1 and 12 so that these pipes may be closed when desired.

The operation of the device is as follows: The aqua-ammonia enters through the pipe 1, passes down the glass container 2 to the thermometer well which is the nipple 13, and the upriser which is the pipe 10. The overflow pipe 12 is connected to some parts of the apparatus, wherein the pressure is the same as that in the pipe 1. This arrangement permits the free circulation of the liquid so that an accurate reading of the hydrometer can be had at any time. The elbow 11 is the equalizing line which will prevent the liquid from being siphoned out of the container. The thermometer 15 permits a proper temperature correction according to the hydrometer reading. This device will provide a continuous indication of the strength of the aqua-ammonia going to the generator, and with a similar device installed in the weak liquor line, the quantity of ammonia boiled off can be readily noted.

We claim:—

1. A device for ascertaining the percentage of liquid in solution, which consists in a transparent container connected with a source of liquid supply and having a hydrometer, a hollow base to which the container is connected, a pipe connecting the said base with the top of the container, and an overflow pipe in connection with the last named pipe above the liquid level desired to be maintained, said base having a thermometer well adjacent to the container, and a thermometer supported in the well.

2. A device for ascertaining the percentage of liquid in solution, which consists in a transparent container connected with a source of liquid supply and having a hydrometer, a hollow base to which the container is connected, a pipe connecting the said base with the top of the container, and an overflow pipe in connection with the last named pipe above the liquid level desired to be maintained.

3. A device of the character specified, adapted to be installed in the liquid line of a refrigerating machine, and comprising a hydrometer casing having a hydrometer, a pipe connecting the ends of the hydrometer casing, said hydrometer casing being connected with the pipe line, and the connecting pipe for the hydrometer casing having an overflow, and a thermometer well between the said connecting pipe and the hydrometer casing.

4. A device of the character specified, adapted to be installed in the liquid line of a refrigerating machine, and comprising a hydrometer casing having a hydrometer, a pipe connecting the ends of the hydrometer casing, said hydrometer casing being connected with the pipe line, and the connecting pipe for the hydrometer casing having an overflow.

5. A device of the character specified comprising a transparent casing having a hydrometer therein and adapted to be installed in the liquid line of a refining machine, a direct connection between the opposite ends of the casing, said last named connection having an overflow at the level at which it is desired to contain the liquid.

JOSEPH HENRY McCRARY.
CHESTER ARTHUR RUSS,